(12) United States Patent
Boettcher

(10) Patent No.: US 6,637,761 B1
(45) Date of Patent: Oct. 28, 2003

(54) HAND TRUCK TABLE MOVER

(76) Inventor: Lloyd Boettcher, 621 E. Lakeshore Dr., Storm Lake, IA (US) 50588

( * ) Notice: Subject to any disclaimer, the term of this patent is extended or adjusted under 35 U.S.C. 154(b) by 8 days.

(21) Appl. No.: 10/011,109

(22) Filed: Nov. 13, 2001

Related U.S. Application Data

(60) Provisional application No. 60/247,542, filed on Nov. 13, 2000.

(51) Int. Cl.$^7$ .............................. B62B 1/12; B62B 1/06
(52) U.S. Cl. ................. 280/47.24; 280/47.28; 280/79.7; 414/490; 414/450; 414/453
(58) Field of Search ................. 280/639, 652, 280/43.1, 43.24, 47.131, 47.24, 47.27, 47.33, 79.7, 47.29, 47.28, 47.35; 414/490, 444, 448, 449, 450, 453, 455

(56) References Cited

U.S. PATENT DOCUMENTS

| | | | | | |
|---|---|---|---|---|---|
| 2,497,440 | A | * | 2/1950 | Denny | 280/47.24 |
| 2,621,815 | A | * | 12/1952 | Gannon | 280/79.7 |
| 2,806,708 | A | * | 9/1957 | Finstad | 280/47.24 |
| 3,031,084 | A | * | 4/1962 | Mugler | 280/79.7 |
| 3,102,733 | A | | 9/1963 | Burnett | |
| D248,937 | S | * | 8/1978 | Figueroa | 280/79.7 |
| 4,439,085 | A | * | 3/1984 | Rodriguez et al. | 280/79.7 |
| 4,505,489 | A | | 3/1985 | Specie | |
| 4,614,349 | A | | 9/1986 | Wenzel | |
| 4,726,602 | A | | 2/1988 | Sanders et al. | |
| D297,579 | S | | 9/1988 | Bateham | |
| D303,030 | S | | 8/1989 | Goldston | |
| 4,921,270 | A | * | 5/1990 | Schoberg | 280/47.27 |
| 5,037,117 | A | * | 8/1991 | Hershberger | 280/79.7 |
| 5,120,072 | A | | 6/1992 | Laramie | |
| 5,123,666 | A | * | 6/1992 | Moore | 280/47.19 |
| 5,163,695 | A | * | 11/1992 | Pakowsky | 280/79.7 |
| 5,244,221 | A | * | 9/1993 | Ward | 280/79.7 |
| 5,716,183 | A | * | 2/1998 | Gibson | 414/451 |
| 5,820,145 | A | * | 10/1998 | Osowski | 280/79.7 |
| 5,871,219 | A | * | 2/1999 | Elliott | 280/79.7 |
| 5,988,659 | A | * | 11/1999 | Young | 280/79.7 |
| 6,135,466 | A | * | 10/2000 | Irwin | 280/47.28 |
| 6,217,045 | B1 | * | 4/2001 | Leyton | 280/79.7 |
| 6,296,262 | B1 | * | 10/2001 | Skinner | 280/79.7 |
| D456,582 | S | * | 4/2002 | Riach | D34/24 |
| 6,454,282 | B2 | * | 9/2002 | Sexton et al. | 280/79.7 |
| 6,474,930 | B1 | * | 11/2002 | Simpson | 414/490 |

* cited by examiner

Primary Examiner—Brian L. Johnson
Assistant Examiner—Jeff Restifo
(74) Attorney, Agent, or Firm—Dann, Dorfman, Herrell and Skillman; Henry H. Skillman

(57) ABSTRACT

A special duty hand truck for maneuvering folding tables and folding chairs having a wheeled base with a transverse shaft, a handle extending outwardly from said shaft, a pair of support arms mounted for pivotal movement on said shaft between an upright position extending away from said base and a folded position extending along the handle, an auxiliary arm pivotally mounted on the shaft between an upright position extending away from said base and a folded position along said handle, and standards extending down from the handle operable to engage the ground surface and provide a fulcrum for the handle which is effective to permit the wheels to be lifted off the surface when the free end of the handle is displaced towards the surface.

19 Claims, 7 Drawing Sheets

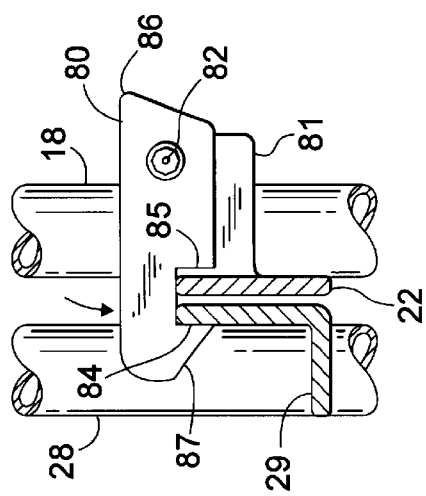
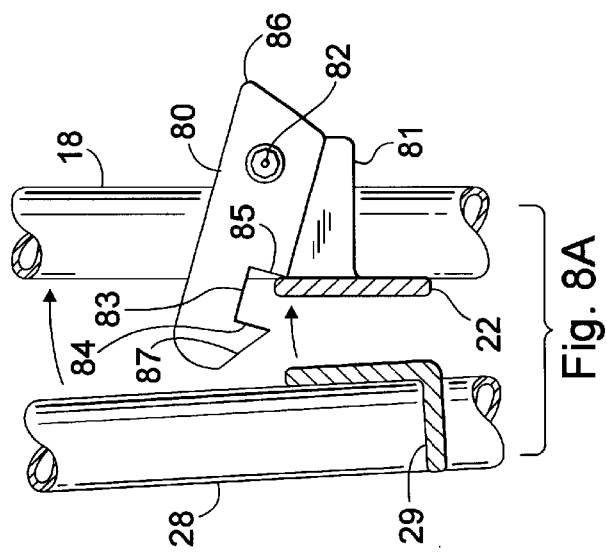
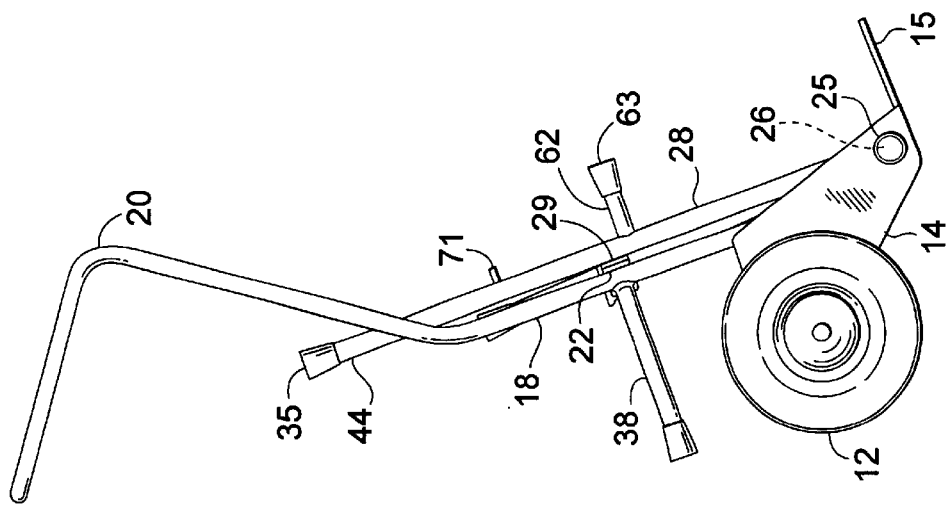

HAND TRUCK TABLE MOVER

Applicant claims the benefit of priority of U.S. Provisional Application No. 60/247,542, filed Nov. 13, 2000.

FIELD OF THE INVENTION

The present invention relates to hand trucks and more particularly to a special duty hand truck for maneuvering folding tables and folding chairs.

BACKGROUND OF THE INVENTION

Folding tables and chairs are designed to be opened and closed by an individual working alone, but tables are designed to be opened and closed while resting them on the one longitudinal edge of the table surface. However, erecting the table from the resting position to the setup position in the work area requires more than one person. Likewise, moving the setup table from one location to another requires more than one person, especially if the table has been set with linen and tableware such as cups, dishes, silverware, and centerpieces. Furthermore, moving the folded tables through narrow passageways between the work area and the storage area is a difficult task for a single person. Placing the tables on the storage rack in the storage area can best be done by more than one person.

Current methods of transporting tables do not provide a satisfactory means for the transport of a table in the setup position by one person, when set with tableware and linen. Furthermore, there is currently not a method of erecting a table from the resting position to the setup position, and vice versa, by a single person. For instance, U.S. Pat. No. 4,439,085, for a "Handcart for Banquet Tables" issued to Thomas A. Rodriguez and Angelo J. Zavaglia, discloses a cart in which you tilt the table to load it on one side of the cart and raise a brace in the center, wherein you can then tip the table level by lifting the opposite side of the table off the floor and wheel the table to a new location. This would not be an acceptable method of carting a table that had already been set with tableware and provides no means to break down or setup the table from storage. Additionally, U.S. Pat. No. 5,037,117, for a "Folding Table Caddie" issued to Richard C. Hershberger discloses a device upon which folding tables may be stacked, stored, and transported when placed on their side; however, no way of setting up, breaking down, or transporting the tables while upright is provided, and it would take more than one person to conveniently place the tables on the caddie.

Since frequently it will only be one person who is available to perform the tasks for a banquet hall, there is a need for a hand truck table mover that can allow a single person to breakdown, setup, and transport a table whether it is in the stacked position, or if it is set up and set with tableware.

SUMMARY OF THE INVENTION

The present invention provides a hand truck which may be used to facilitate the setup of tables and movement of tables from one area to another by a single worker in a convenient manner. Furthermore, the present invention provides a hand truck which can move tables in either the folded position or the a setup position with minimum strength requirement by a table handler.

It is an objective of the present invention to provide a means for an individual to transport a setup table, which may have tableware on top of it.

It is a further objective of the present invention to provide a means for an individual to set up and break down a table having folding legs.

It is yet another objective of the present invention to provide a means for an individual to transport a folded table in the longitudinal direction through narrow doorways and passageways.

To this end, a hand truck table mover is provided. The hand truck table mover includes a base section, which has wheels journaled upon it. An elongated main prop assembly is attached to the base section and extends outwardly from the base section where it terminates in two spaced apart perches for supporting the table. The main prop assembly is capable of being pivoted from a first position to a second position. Also included is an elongated auxiliary prop assembly which is capable of pivoting from a first position to a second position, and is mounted on the base. The auxiliary prop assembly includes a table perch, which in conjunction with the main props assembly table perches, provides at least a three point table support for a table that is setup with tableware. An elongated handle is provided, which attaches to the base, extends outwardly to a distal end, and includes a ground engaging base extending downwardly from the handle to act as a fulcrum to lift the wheels off the ground when the distal end of the handle is pressed downward, allowing an individual to setup a folded table that is currently in the longitudinal direction, or to breakdown a currently setup table. An extension extends from one side or the other of the hand truck to rest a side of the table while transporting it longitudinally through narrow doorways and passageways.

BRIEF DESCRIPTION OF THE DRAWINGS

FIG. 7 is a side elevation of the hand truck showing support arms in the closed position;

FIG. 8A is a fragmentary detail view of a locking mechanism for the support arms in the open position;

FIG. 8B is a fragmentary detail view of the locking mechanism for the support arms in the closed position;

DESCRIPTION OF THE PREFERRED EMBODIMENT

Figure 2:
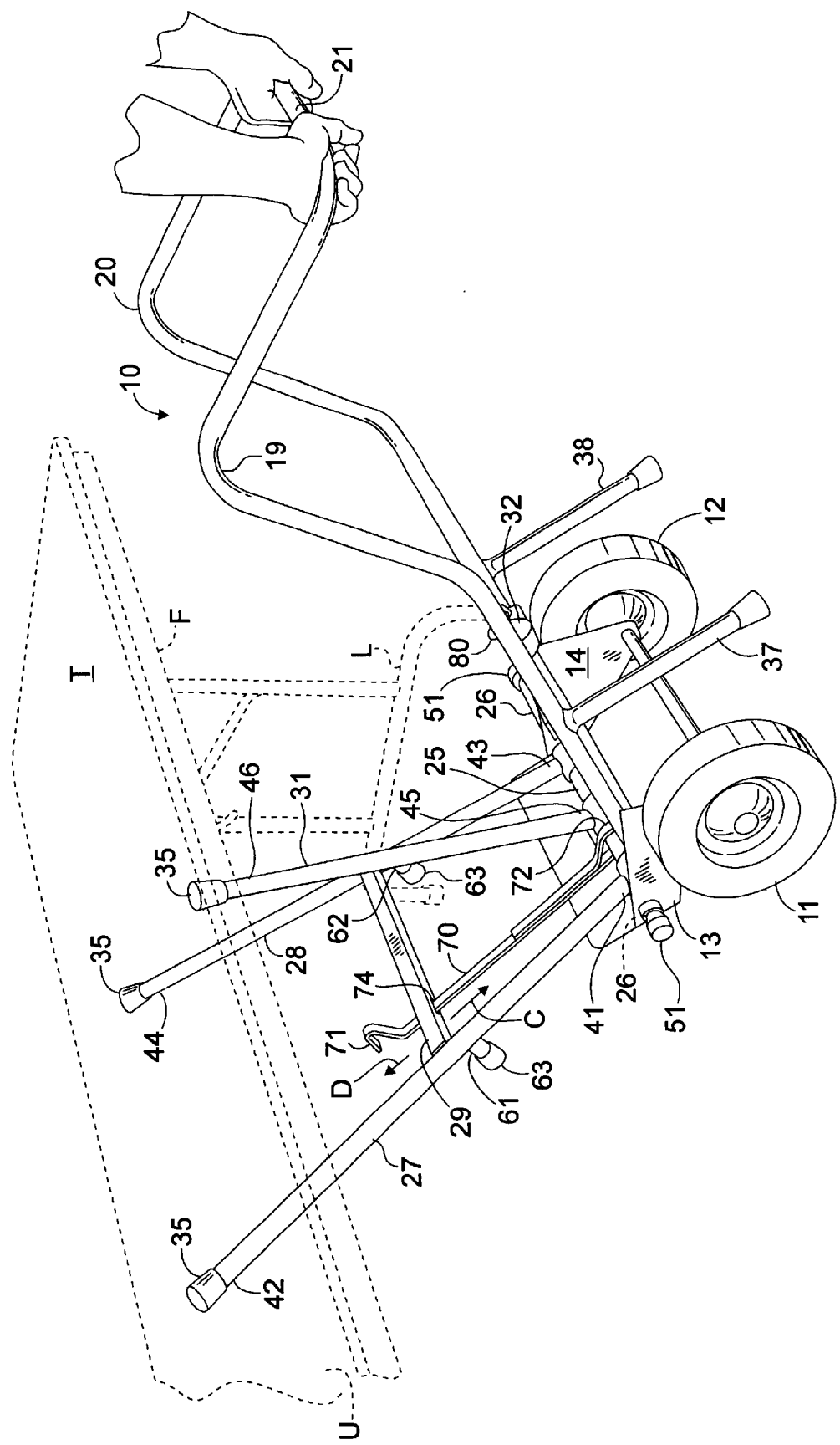
FIG. 2 is a perspective view of the hand truck in a position for transporting a setup table with the setup table shown in broken lines.
Figure 3:
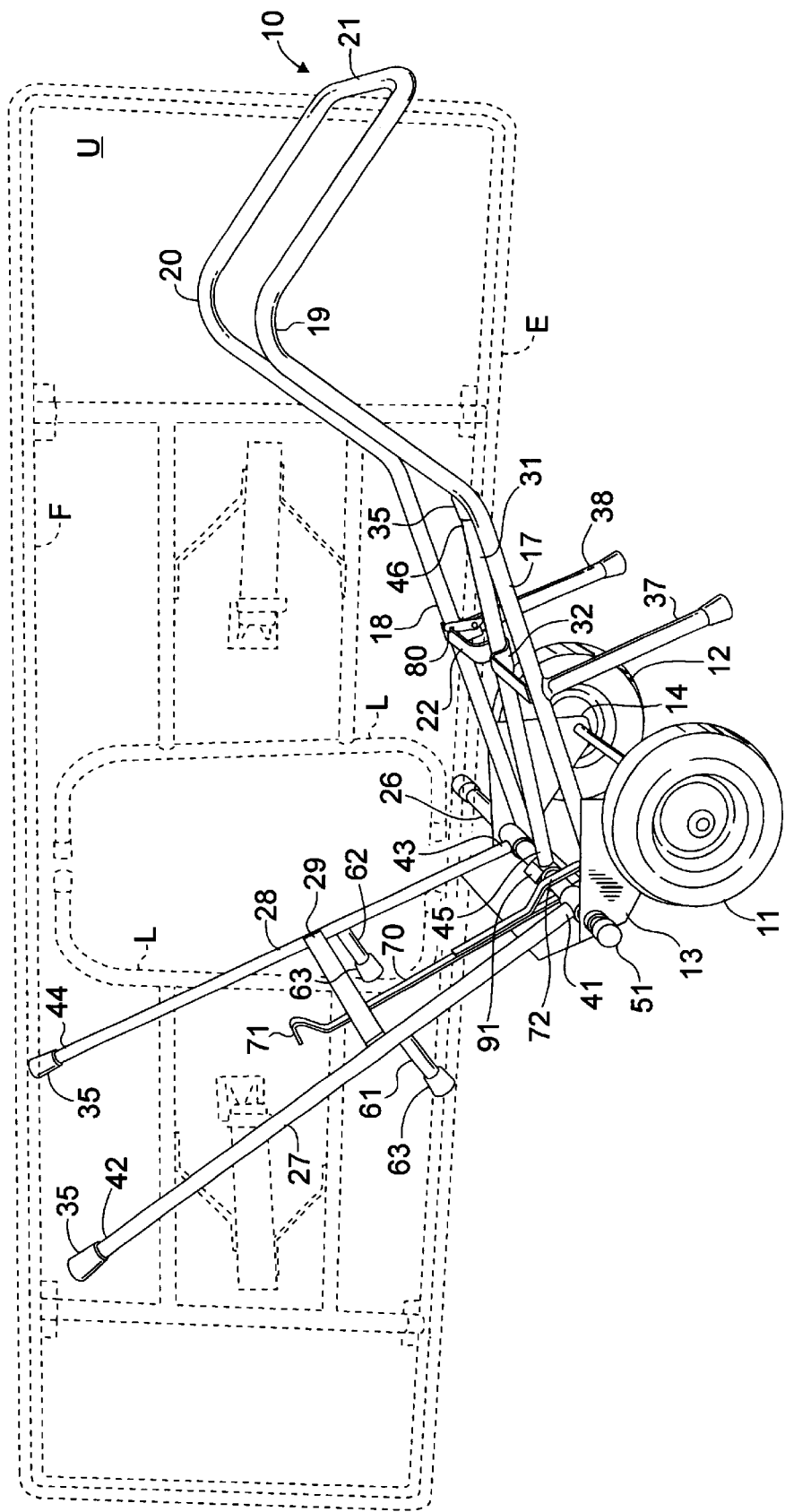
FIG. 3 is a perspective view of the hand truck of FIG. 1 shown in the position for transporting a folded table, the folded table being shown in broken lines.
Figure 6:
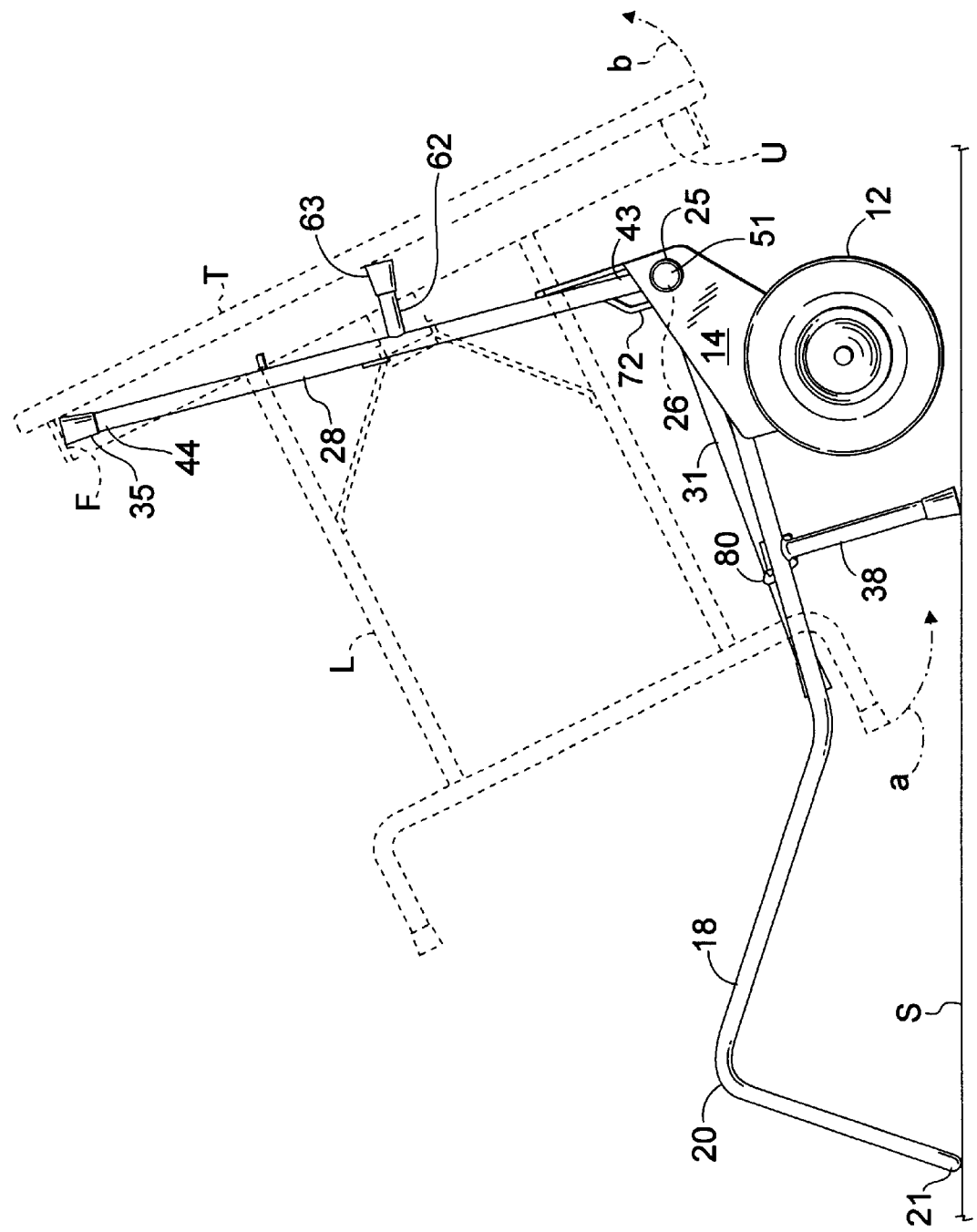
FIG. 6 is a side elevation of the hand truck in a position for erecting the unfolded table from a rest position to a setup position, the unfolded table being shown in broken lines.

Referring now to the Figures in general, wherein like reference numerals refer to the same components across the several views, there is shown a hand truck table mover 10 for aiding an individual in breaking down, setting up, and transporting a table. As shown in FIGS. 2, 3 and 6, the commonly-end folding table has a table top T with a depending peripheral flange F surrounding the underside U of the table top. Folding legs L are pivotally mounted on the underside to be moved from a folded position against the underside U to a setup position perpendicular to the underside U.

Figure 1:
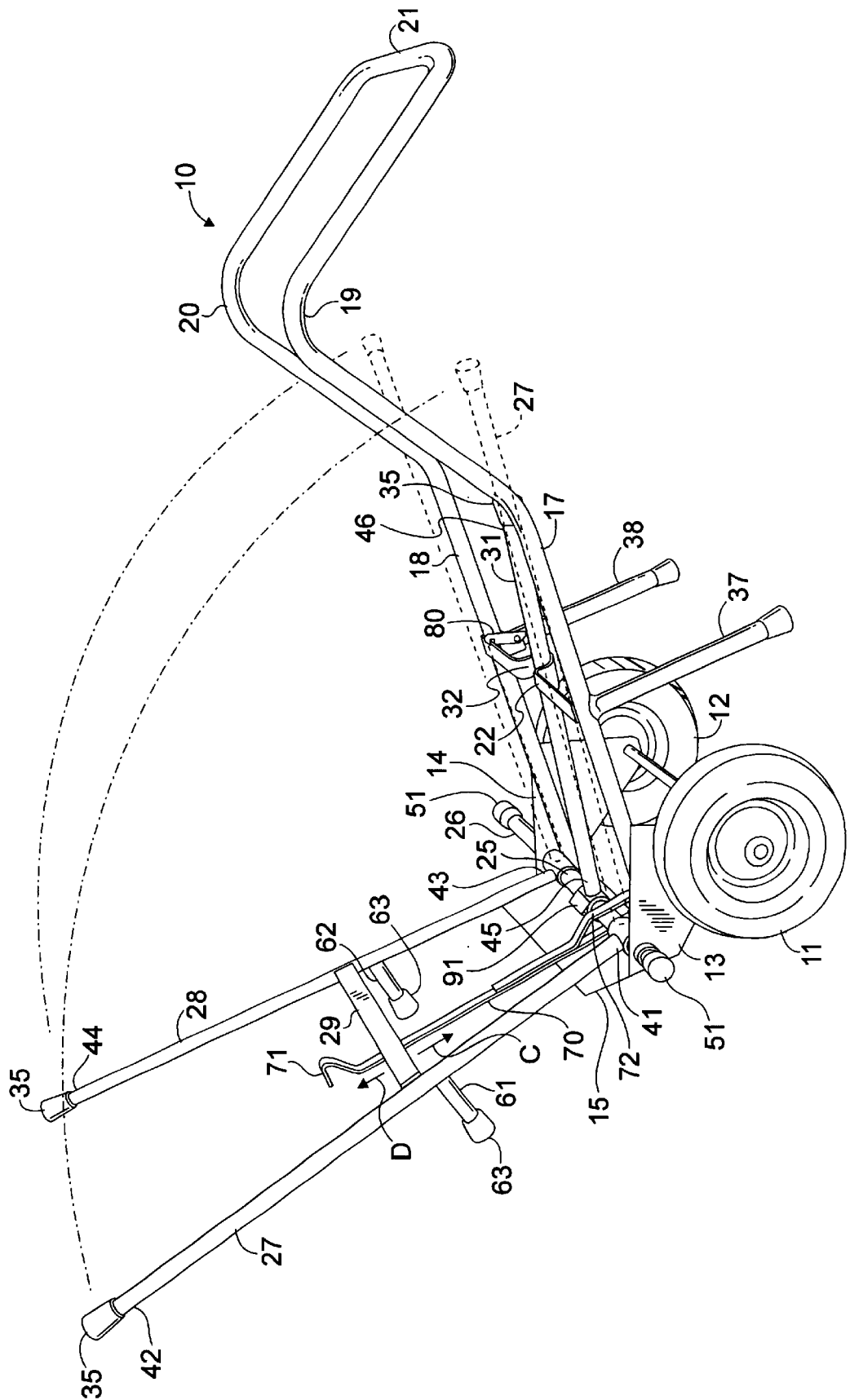
FIG. 1 is a perspective view of a hand truck embodying the present invention.

Referring now to FIGS. 1 and 2, a hand truck 10 embodying the present invention is illustrated. The hand truck 10 includes a base composed of upstanding base plates 13 and 14 on opposite sides of the hand truck 10 and a toe plate 15 extending between the base plates and projecting outwardly which enables the hand truck to be used as a conventional hand truck for many operations as illustrated in FIG. 7. The hand truck has a pair of wheels 11 and 12 which are journaled in the base plates 13 and 14 on opposite sides of the hand truck 10. Alternatively, less than, or more than, two wheels may be used on the hand truck.

Figure 4:
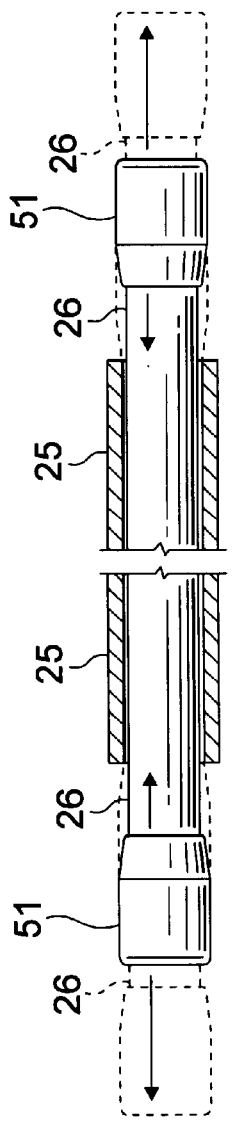
FIG. 4 is a cross section of a shaft and extension according to the present invention.

Means is provided for transporting a folded table in the form of a transverse shaft 25 and an extension shaft 26. The transverse shaft 25 extends between the base plates 13 and 14. Referring to FIGS. 3 and 4, the transverse shaft 25 may be of a hollow construction so as to allow an extension shaft 26 to be enclosed within transverse shaft 25. Extension shaft 26 is slidably disposed within shaft 25 and has crutch tips 51 at opposite ends, so that shaft 26 can be projected from either end of transverse shaft 25 to provide an outwardly-projecting support element for the lower edge of the table top T, as indicated at E in FIG. 3. Crutch tips 51 are provided on the opposite ends of the extension shaft 26 as stops to prevent extension shaft 26 continuing to slide into the transverse shaft 25 at one end, and to stop the table from sliding off the other end of the extension shaft 26 during transport. As an alternative to the arrangement shown in FIGS. 3 and 4, the transverse shaft 25 may be of suitable length to extend beyond one side of the base and the shaft may be mounted for longitudinal displacement within the base so that either end of the shaft may project from the base. In such case, the truck will have a main prop assembly and an auxiliary support arm mounted on the transverse shaft in a manner to allow to allow the transverse shaft to be slid longitudinally between its opposite limit positions.

The shaft 25 pivotally mounts a main prop assembly means for supporting the table flange F as shown in FIGS. 3 and 6. An auxiliary support arm 31 is also mounted on the shaft 25 to provide a three-point support for a table top T as shown in FIG. 2. The main prop assembly means in the present embodiment of the invention includes a pair of support arms 27 and 28 which diverge upwardly and outwardly from the toe plate 15. The support arms 27 and 28 may also extend upwardly generally parallel to one another. The support arms 27 and 28 are interconnected by a strut 29 which permits the arms 27 and 28 to be pivotally displaced together from a folded first position shown in broken lines in FIG. 1 to an upright second position shown in full lines. The arms are adapted to be latched in the folded position by a latch mechanism 80, and maintained in the upright position by a retaining mechanism 70, both of which are described in more detail hereafter. More specifically, referring to FIGS. 1 and 2, the arm 27 includes a first end 41 and a second end 42. The first end 41 of the arm 27 is pivotally attached to one end of the shaft 25 proximate to the base plate 13, and the arm 27 extends outwardly to a second end 42, which includes a table perch 35 in the form of a crutch tip. Likewise, the arm 28 includes a first end 43 and a second end 44. The first end 43 of the arm 28 is pivotally attached to the opposing side of the shaft 25 proximate to the base plate 14. The arm 28 extends outwardly from the shaft 25 to a second end 44, which also includes a table perch 35 in the form of a crutch tip. The strut 29 is attached to the arms 27 and 28 intermediate the first and second ends to maintain the arms 27 and 28 in a generally coplanar relationship while pivoting from the first position to the second position.

In order to avoid interference between the supported table T and the wheels 11 and 12, standoff means are provided. Referring to FIGS. 1 and 6, standoff shafts 61 and 62 are shown with standoff tips 63, which engage an underside U of the table during setup and breakdown, and during storage, so as to prevent the lip flange F of the table from scraping against the wheels 11 and 12 during transportation to and from a storage area. The standoff shaft 61 is perpendicularly mounted on the shaft 27 in general proximity to. the strut 29, and includes a standoff tip 63 mounted on the end. The standoff shaft 62 is perpendicularly mounted on the shaft 28, and generally parallel to the standoff shaft 61. The shaft 62 is also mounted in close proximity to the strut 29, and also includes a standoff tip 63 on the end.

Figure 9B:
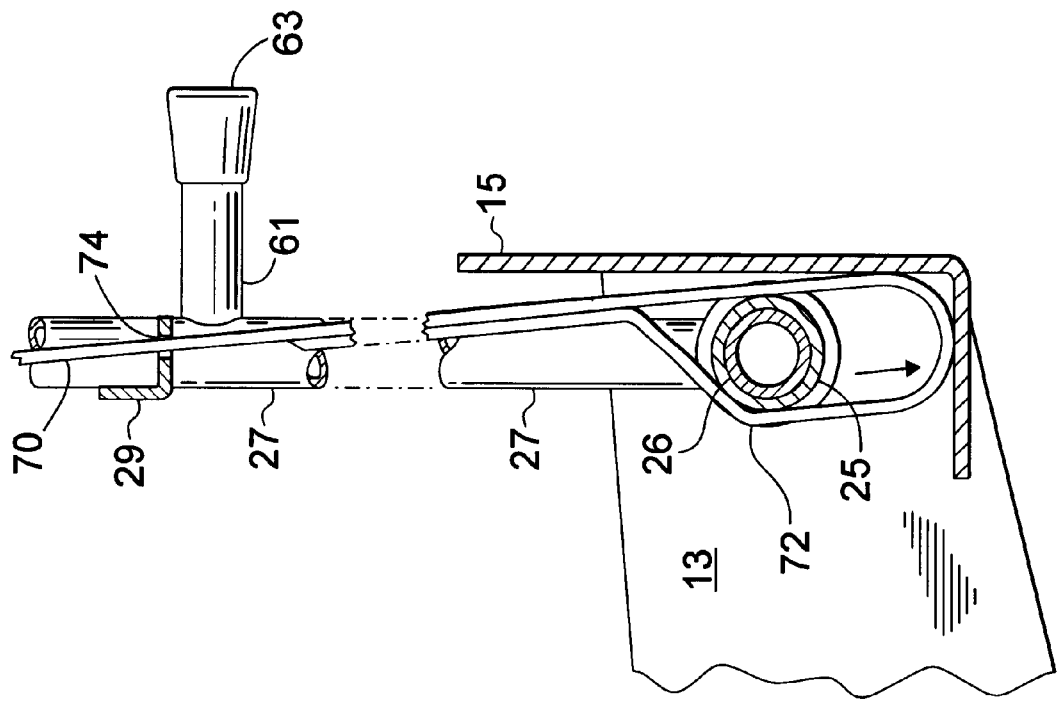
FIG. 9B is a fragmentary detail view of the stirrup device in the engaged position.
Figure 9A:
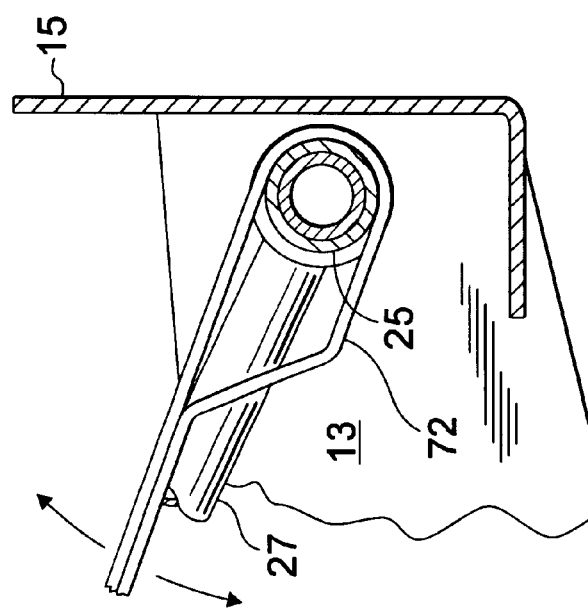
FIG. 9A is a fragmentary detail view of a stirrup device in the disengaged position.

Means is provided to retain the main prop assembly in the upright position. Referring to FIGS. 2, 9A, and 9B, mounted on the main prop assembly through an opening 74 in the strut 29 is a retaining bar 70, which maintains the support shafts 27 and 28 in the second extended position when the retaining bar 70 is in a first, or engaged position, and releases the support arms 27 and 28 to pivot back into their folded first position when the retaining bar 70 is in a second, or disengaged, position. The retaining bar 70 includes a handle 71 mounted on one end for a user to lift the bar out of the engaged position and to push it into the engaged position. Also included on the retaining bar 70 is a stirrup 72 formed into the bar 70 at the opposite end of the bar to the handle 71. When the support shafts 27 and 28 are in the second position, and the retaining bar 70 is in the first, or engaged, position, which is accomplished by pushing the handle 71 in the direction of the arrow C in FIG. 2, the stirrup 71 extends beyond the shaft 25, and prevents the shafts 27 and 28 from pivoting back to the first position by engaging the toe plate 15 to prevent rotation. When the handle 71 is pulled in the direction of the arrow marked d, the stirrup 72 is pulled up flush with the underside of the shaft 25 such that the retaining bar 70 is moved into the second, or disengaged, position, and the support shafts 27 and 28 are free to pivot about the shaft 25 to their first, or folded positions.

The hand truck table mover has handles to enable maneuvering of the hand truck in the various operations. Attached to the base are handle shafts 17 and 18, having first ends 45 and 46 respectively, mounted on the base and extending rearwardly from the toe plate 15 approximately perpendicular thereto, and generally parallel to one another. Specifically, the first end 45 of the handle 17 is mounted proximate to the base plate 13, and the first end 46 of the handle 18 is mounted proximate to the base plate 14. At a spaced distance from the toe plate 15, the handles curve upwardly and have reverse curves extending downwardly as shown at 19 and 20 in FIG. 1, terminating in a cross connection second end 21 which serves as a hand grip. A reinforcing strut 22 extends between the shafts 17 and 18 to provide rigidity to the handles.

Means are provided to facilitate setting up and breaking down a table. Located on the handle shafts 17 and 18 are ground engaging standards 37 and 38 projecting downwardly therefrom. The ground engaging standard 37 extends downwardly from the shaft 17 and the ground engaging standard 38 extends downwardly from the shaft 18 from the junctions of the strut 22 with the shafts. The length of the ground engaging standards 37 and 38 is such that when they engage the floor, the cross connection 21 may be pressed down against the floor to lift the wheels 11 and 12 off the floor, as illustrated in FIG. 6.

The truck of the present invention is effective to facilitate the erection of the table to the setup position, and breaking the table down from the setup position. The rearward curved portions 19 and 20 of the handles greatly facilitate this operation by providing a portion of the handle for an individual to grasp when the cross connection section 21 is engaged with a floor surface S. In performing the setup operation, the table is set on edge with the table top T positioned substantially vertically. The table legs L are then unfolded as shown in FIG. 4 to the support position and the hand truck may then be moved between the legs so that the support arms 27 and 28 engage under the lip flange F surrounding the underside U of the table top T. The table may then be lifted off the support surface S by using the ground engaging standards 37 and 38 as a fulcrum, with the handler pressing down on the reversely curved portions 19 and 20 until the cross connection section 21 engages the floor surface S. This raises the wheels 11 and 12 of the truck off the surface S to stabilize the truck against rolling. With reference to FIG. 6, the retainer 70 is raised to allow the support arms 27 and 28 to pivot towards the handle, thereby lowering the table until the lower leg engages the floor surface S as it rotates in the direction of the arrow a and the table top rotates in the direction of the arrow b. Further displacement of the arms 27 and 28 allows the table top T to assume a position parallel to the floor surface S with the feet of the legs L resting on the floor surface S. The arms 27 and 28 may then drop to their first position where they may be latched against the handle as shown in FIG. 7. The handle may then be raised to re-engage the wheels 12 with the floor surface and the truck may be rolled out from under the table. The individual setting up the table may guide the table to its proper position from the handle side of the truck. To break down a table when it has been cleared, the arms 27 and 28 are moved to their second position as shown in FIG. 6 and the perches 35 at the top of the arms 27 and 28 engage with the flange F of the table by raising the handle 18 to allow the perches 35 of the arms 27 and 28 to engage behind the flange of the set-up table. The handle may then be lowered to raise the table allowing the set-up table to swing toward the operator until the underside U of the table engages the standoffs 62. When in the position shown in FIG. 6, the handles may be lifted to allow the table to rest on its lower edge at which time the arms 27 and 28 may be moved out of the way and the legs L may be folded against the underside U of the table for storage.

Means is provided to latch the main prop assembly in the first, or folded, position. Referring now to FIGS. 8A and 8B, there is shown a latch 80 for holding the main prop assembly in the folded position. The latch 80 includes a notch 83, having a first keeper edge 84 and a second stop edge 85, a pivot 82, a leading edge 87, and a press point 86. The latch 80 is pivotally mounted on a plate 81 which is perpendicularly attached to the strut 22, such that the latch 80 may pivot about the pivot 82. When pressure is placed on the press point 86, for instance by a foot, the latch 80 is rotated into the open position as illustrated in FIG. 8A, wherein the second stop edge 85 engages the strut 22 and the first keeper edge 84 of the notch 83 swings clear so that the strut 29 is not held in place. Once the strut 29 is clear of the latch 80, foot pressure is removed from the press point 86 and the latch 80 pivots back into the closed position by gravity. As illustrated in FIG. 8B, when the main prop assembly is pivoted into the closed position, the strut 29 first engages the leading edge 87 and displaces the latch 80 from the closed position to the open position as the strut 29 slides along the leading edge 87, until the strut 29 reaches the notch 83, at which point the latch 80 drops back down into the closed position and the first keeper edge 84 engages the strut 29 and latches the main prop assembly in the folded position.

Figure 5:
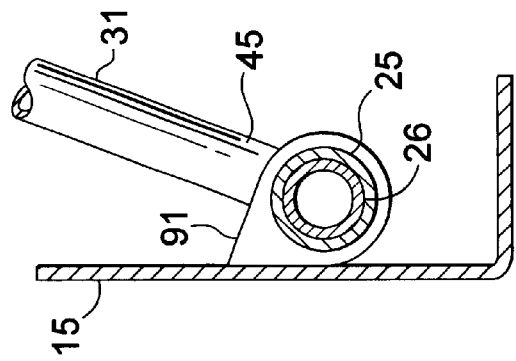
FIG. 5 is a fragmentary detail view of a foot section of an auxiliary prop assembly according to the present invention.

In order to provide the three-point support for transporting a setup table, an auxiliary table support means is provided, in the present embodiment an auxiliary support arm 31. The auxiliary support arm 31 is journaled on the shaft 25 intermediate the support arms 27 and 28. The arm 31, includes a first end 45 pivotally mounted on shaft 25 generally centrally, and is movable independently of the support arms 27 and 28, and a second end 46 which includes a table support perch 35. Also included at the first end 45 of the arm 31 is a stop 91, as illustrated in FIG. 5, which engages the toe plate 15 when the arm 31 is in the second position to prevent the arm 31 from rotating beyond the second position. The arm 31 is shown in FIG. 1 in the folded position resting within a socket 32, which is formed in the reinforcing strut 22. The auxiliary arm 31 is independently mounted for pivotal movement between the folded first position shown in FIG. 1 and the upright second position shown in FIG. 2 where it may provide a three-point support for an upright table. Alternatively, auxiliary support means may be provided to form a four-point support for an upright table.

As shown in FIG. 2, the auxiliary arm 31 enables the table to be transported by an individual person while set up. As shown in FIG. 2, the perches 35 of the arms 27, 28 and 31 are adapted to engage the undersurface U of the table top and support the same while it is set up. FIG. 2 illustrates a rectangular table, but the truck is equally able to transport round tables. Thus, with this truck, the table may be moved by a single person while set up, and even while the surface of the table is set with dishes, silverware and food or other articles. By reason of the arms being subjected only to stress along their longitudinal axis, the arms will support a table when loaded with books, folding chairs, or other heavy articles. The length of the handles including the shafts 17, 18 and the reversed curved portions 19 and 20 is sufficient to provide adequate leverage to enable the setup table to be lifted and rolled from position to position using the wheels 11 and 12.

To facilitate moving the folded table through limited width areas when the table is folded and on edge, the auxiliary arm 31 may be displaced to its folded position as shown in FIG. 3, and one of the support arms 27 and 28, in FIG. 3 the support arm 28 may be used to engage under the lip F of the table T so as to elevate the upper edge of the table and allow the lower edge of the table to be moved onto the extension shaft 26. When supported as shown in FIG. 3, the folded table may be readily moved by an individual handler through narrow doorways or passageways without the need for a second person.

While the present invention has been described in terms of the foregoing exemplary embodiments, variations within the scope and spirit of the present invention as defined by the claims following will be apparent to those of ordinary skill in the art.

What is claimed is:

1. A hand truck for maneuvering tables having a top and folding legs adapted when unfolded to support the table on a floor, comprising:

a base;

at least one floor-engaging wheel mounted on said base;

an elongated main prop assembly having a first end pivotally mounted on said base, and a second end extending outwardly from said base and having at least two spaced apart main table perches, said assembly being capable of being pivoted from a first stored position to a second active position;

an auxiliary prop assembly having a first end pivotally mounted on said base independently of said main prop assembly adjacent the first end of said main prop assembly and a second end extending outwardly from said base and having at least one auxiliary table perch, said auxiliary prop capable to pivot from a first stored position to a second active position; and an elongated handle, having a first end and a second end, said first end mounted on said base adjacent the first ends of said main prop assembly and said auxiliary prop assembly and extending outwardly from said base, said at least two main table perches and said at least one auxiliary table perch, when said main and auxiliary support props are in their second active positions, providing at least a three-point support for the table top.

2. The hand truck of claim 1, including floor-engaging standards extending in one direction transversely from said handle intermediate said first and said second ends of said handle, wherein said second end of said handle includes a terminal portion extending in a direction opposite to said one direction, such that when said terminal portion is pressed toward the floor, the said at least one wheel is lifted off the floor as the handle is levered about the standards as a fulcrum.

3. The hand truck of claim 1, wherein said base includes a hollow shaft pivotally mounting said main and auxiliary prop assemblies and an extension projecting beyond said base for engaging an edge of said table top when the top is in an upright position.

4. The hand truck of claim 3, wherein said extension includes an extension shaft slidably disposed within said hollow shaft such that said extension shaft is capable of projecting beyond either side of said base.

5. The hand truck of claim 1 for maneuvering a table having a flange depending from the periphery of the table top, wherein said main prop assembly includes a first support shaft and a second support shaft coplanar with and diverging outwardly relative to said first support shaft from said first end to said second end, said first and second support shafts terminating in said two main table perches, said perches being adapted to engage the flange of the table.

6. The hand truck of claim 5, comprising a support strut connected to said first support shaft and second support shaft to maintain said first and second support shafts coplanar during pivoting.

7. The hand truck of claim 6 comprising:
a first standoff shaft perpendicularly mounted on said first support shaft;
a second standoff shaft perpendicularly mounted on said second support shaft;
said first and second standoff shafts adapted to engage the underside of the table top when the table is supported by the perches engaging the flanges.

8. The hand truck of claim 6, comprising a retainer capable of displacement from a first position to a second position, in said first position said retainer retaining said first and second support shafts in the first stored position, and in said second position allowing said first and second support shafts to pivot freely to the second active position.

9. The hand truck of claim 1, wherein said handle comprises a socket for receiving said auxiliary prop assembly when said auxiliary prop assembly is in the first position.

10. The hand truck of claim 9, wherein said handle includes a first shaft and a second shaft, and a reinforcing strut spanning between said first and second shafts, said socket being positioned in said reinforcing strut.

11. The hand truck of claim 10, including a latching mechanism attached to said reinforcing strut to hold said support strut against said reinforcing strut when said main prop assembly is in said first stored position.

12. The hand truck of claim 1, wherein sold base includes a first side plate and a second side plate and a second wheel, said at least one wheel being journaled for rotation on said first side plate of said base and said second wheel being journaled for rotation on said second side plate of said base.

13. The hand truck of claim 1, wherein said elongated auxiliary prop assembly includes a stop mounted adjacent the first end of said elongated auxiliary prop assembly, said stop adapted to engage said base to prevent said elongated auxiliary prop assembly from pivoting beyond said second position.

14. The hand truck of claim 1, wherein said handle comprises:
a first shaft, having a first end mounted on said base and a second end extending outwardly therefrom;
a second shaft generally parallel to said first shaft of said handle, having a first end mounted on said base and a second end extending outwardly therefrom; and
a cross connection having a first end and a second end, said first end of said cross connection connected to said second end of said first shaft of said handle, and said second end of said cross connection connected to said second end of said second shaft of said handle, said cross connection section being perpendicular to said first and second shafts of said handle;
said first and second shafts of said handle each comprising a reversely curved section intermediate said base and said cross connection section, said reversely curved sections providing a grip point for gripping said handle when said cross connection is in contact with the floor.

15. A hand truck for maneuvering folding tables, comprising:
a base;
a pair of wheels journaled on said base;
an extension extending transversely outward from said base for supporting a table in the longitudinal direction;
a handle, said handle comprising a first shaft, having a first end mounted on said base and a second end extending outwardly therefrom, a second shaft generally parallel to said first shaft of said handle, having a first end mounted on said base and a second end extending outwardly therefrom, and a cross connection having a first end and a second end, said first end of said cross connection section connected to said second end of said first shaft of said handle, and said second end of said cross connection section is connected to said second end of said second shaft of said handle;
a prop assembly comprising a first support shaft, having a first end and a second end, said first end pivotally mounted on said base a second support shaft, diverging slightly from said first support shaft, having a first end and a second end, said first end pivotally mounted on said base and a support strut extending between said first and second support shafts, said prop assembly capable of being pivoted from a first position generally parallel to said handle to a second position generally perpendicular to said handle, and extending outwardly from said base;

an auxiliary support assembly comprising a third support shaft, having a first end and a second end, said first end pivotally connected to said base, and being capable of pivoting from a first position generally parallel to said handle to a second position to form a three-point arrangement with said first and second support shafts;

a first floor support leg, mounted on said handle intermediate said first and second ends, and extending transversely therefrom;

a second floor support leg, mounted on said handle intermediate said first and second ends, and extending transversely therefrom;

a reinforcing strut extending between said first and second shafts of said handle;

a socket in said reinforcing strut, for retaining said third support shaft in said first position;

a latch, mounted on said reinforcing strut for latching said prop assembly in the first position; and a retaining bar capable of displacement from a first position to a second position, said retaining bar retaining said prop assembly when said retaining bar is in the first position, and allowing said prop assembly to pivot freely when said retaining bar is in the second position.

16. A hand truck for maneuvering folding tables comprising a base having wheels journaled thereon, a handle extending outwardly from said base, a transverse shaft mounted on said base, a pair of support arms mounted for pivotal movement on said shaft between an upright position extending away from said base and a folded position extending along said handle, said support arms diverging outwardly from said transverse shaft, and an auxiliary arm pivotally mounted on said base between an upright position extending away from said base and a folded position along said handle, said auxiliary arm being mounted on said base between said diverging support arms, each of said support arms and said auxiliary arm having a perch adapted in the upright positions thereof to provide a three-point support for a table.

17. A hand truck according to claim 16 wherein said handle extends away from said shaft in a radial direction and said support arms are disposed at an obtuse angle to said handle in said upright position of the support arms and said auxiliary arm forms an acute angle with said handle in the upright position of the auxiliary arm.

18. A hand truck according to claim 16 wherein said shaft includes an extension projecting outwardly from said base to provide a support for the folded table.

19. A hand truck according to claim 16, said wheels being adapted to roll on a floor surface, said handle having a proximal end portion extending outwardly from said base and terminating in a free end portion, said truck including standards projecting downwardly from the proximal end portion of said handle between said base and said free end portion, said free end portion projecting upwardly from the proximal end portion of said handle, and then downwardly with a reverse curve, said standards operable to engage the floor surface and provide a fulcrum for the handle which is effective to permit the wheels to be lifted off the surface when the free end of the handle is displaced towards the surface.

* * * * *